(12) United States Patent
Fargeix et al.

(10) Patent No.: US 11,720,494 B1
(45) Date of Patent: Aug. 8, 2023

(54) CACHE EVICTION CONTROL FOR A PRIVATE CACHE IN AN OUT-OF-ORDER DATA PROCESSING APPARATUS

(71) Applicant: Arm Limited, Cambridge (GB)

(72) Inventors: Yohan Fernand Fargeix, Nice (FR); Lucas Garcia, Antibes (FR); Luca Nassi, Antibes (FR); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/692,305

(22) Filed: Mar. 11, 2022

(51) Int. Cl.
*G06F 12/08* (2016.01)
*G06F 12/0802* (2016.01)
*G06F 12/12* (2016.01)

(52) U.S. Cl.
CPC .......... *G06F 12/0802* (2013.01); *G06F 12/12* (2013.01); *G06F 2212/60* (2013.01)

(58) Field of Classification Search
CPC ... G06F 12/0802; G06F 12/12; G06F 2212/60
See application file for complete search history.

(56) References Cited

U.S. PATENT DOCUMENTS 10,127,156 B1 * 11/2018 Yan .................. G06F 3/0647

* cited by examiner

*Primary Examiner* — Jae U Yu
(74) *Attorney, Agent, or Firm* — Nixon & Vanderhye P.C.

(57) ABSTRACT

Apparatuses and methods relating to controlling cache evictions are disclosed. Processing circuitry which execute instructions out-of-order is provided with a private cache into which blocks of data are copied from a shared storage location to which the processing circuitry shares access. The processing circuitry also has a read-after-read buffer, into which an entry is allocated when out-of-order execution of a load instruction occurs comprising an address accessed by the load instruction. The address remains as a valid entry in the read-after-read buffer until the load instruction is committed. Eviction of an eviction candidate block of data from the private cache to the shared storage location is controlled in dependence on whether the eviction candidate block of data has a corresponding valid entry in the read-after-read buffer.

13 Claims, 7 Drawing Sheets

CACHE EVICTION CONTROL FOR A PRIVATE CACHE IN AN OUT-OF-ORDER DATA PROCESSING APPARATUS

TECHNICAL FIELD

The present disclosure relates to data processing. In particular, the present disclosure relates to cache eviction control for a private cache in an out-of-order data processing apparatus.

DESCRIPTION

Instruction processing circuitry in a data processing apparatus may be arranged to execute instructions out-of-order with respect to a programmed sequence of the instructions due to the instruction throughput advantages that this can bring. Instruction processing circuitry may also be provided with an associated private cache arranged to hold temporary copies of data items which are frequently being accessed by the data processing being carried out. Although the private cache is only associated with the instruction processing circuitry, the copies of the data items may be retrieved from a shared storage location to which agents other than the instruction processing circuitry have access.

SUMMARY

In one example embodiment described herein there is an apparatus comprising: processing circuitry configured to execute instructions out-of-order with respect to a programmed sequence of the instructions; a private cache associated with the processing circuitry and configured to store copies of blocks of data comprising data which the instructions subject to data processing operations, wherein a block of data is copied into the private cache from a shared storage location to which the processing circuitry shares access; a read-after-read buffer, wherein out-of-order execution of a load instruction by the processing circuitry is configured to cause allocation of an entry in the read-after-read buffer comprising an address accessed by the load instruction, wherein the address remains as a valid entry in the read-after-read buffer until the load instruction is committed; and cache content control circuitry is configured to control an eviction of an eviction candidate block of data from the private cache to the shared storage location in dependence on whether the eviction candidate block of data has a corresponding valid entry in the read-after-read buffer.

In one example embodiment described herein there is a method of data processing comprising: executing instructions in processing circuitry out-of-order with respect to a programmed sequence of the instructions; storing copies of blocks of data comprising data which the instructions subject to data processing operations in a private cache associated with the processing circuitry, wherein a block of data is copied into the private cache from a shared storage location to which the processing circuitry shares access; allocating an entry into a read-after-read buffer in response to out-of-order execution of a load instruction, the entry comprising an address accessed by the load instruction, wherein the address remains as a valid entry in the read-after-read buffer until the load instruction is committed; and controlling an eviction of an eviction candidate block of data from the private cache to the shared storage location in dependence on whether the eviction candidate block of data has a corresponding valid entry in the read-after-read buffer.

In one example embodiment described herein there is an apparatus comprising: means for executing instructions out-of-order with respect to a programmed sequence of the instructions; means for storing copies of blocks of data comprising data which the instructions subject to data processing operations in a private cache associated with the means for executing instructions, wherein a block of data is copied into the private cache from a shared storage location to which the means for executing instructions shares access; means for allocating an entry into a read-after-read buffer in response to out-of-order execution of a load instruction, the entry comprising an address accessed by the load instruction, wherein the address remains as a valid entry in the read-after-read buffer until the load instruction is committed; and means for controlling an eviction of an eviction candidate block of data from the private cache to the shared storage location in dependence on whether the eviction candidate block of data has a corresponding valid entry in the read-after-read buffer.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
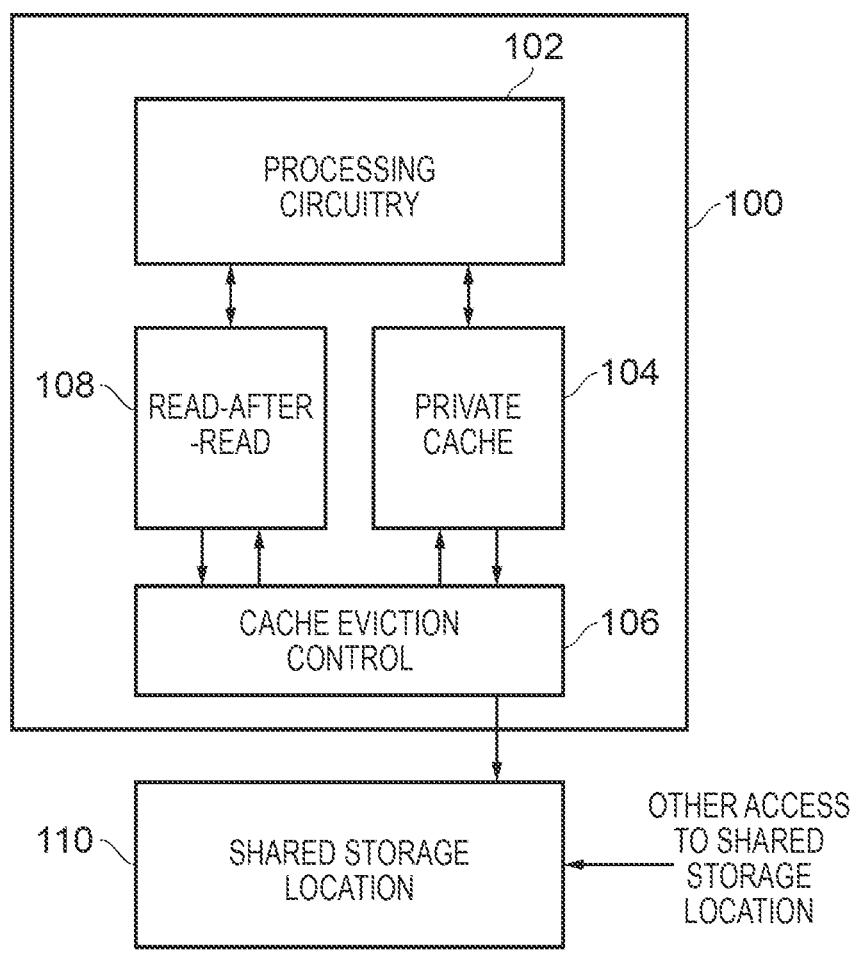
FIG. 1 schematically illustrates a data processing apparatus in accordance with some examples.

Before discussing the embodiments with reference to the accompanying figures, the following description of embodiments is provided.

In accordance with one example configuration there is provided an apparatus comprising: processing circuitry configured to execute instructions out-of-order with respect to a programmed sequence of the instructions; a private cache associated with the processing circuitry and configured to store copies of blocks of data comprising data which the instructions subject to data processing operations, wherein a block of data is copied into the private cache from a shared storage location to which the processing circuitry shares access; a read-after-read buffer, wherein out-of-order execution of a load instruction by the processing circuitry is configured to cause allocation of an entry in the read-after-read buffer comprising an address accessed by the load instruction, wherein the address remains as a valid entry in the read-after-read buffer until the load instruction is committed; and cache content control circuitry is configured to control an eviction of an eviction candidate block of data from the private cache to the shared storage location in dependence on whether the eviction candidate block of data has a corresponding valid entry in the read-after-read buffer.

In a data processing apparatus which executes instructions out-of-order with respect to programme order, the provision of a read-after-read buffer supports such out-of-order execution by tracking the usage of data which has been the subject of speculative loads. For example, where out-of-order instruction execution can mean that a younger load can be executed before an older load (where younger/older refers to the relative position of the respective instructions in programme order). Whilst in an isolated system, read-after-read does not represent a data hazard, it has the potential to become one when access to the data which is the subject of the read is shared with another agent which has the ability to modify that data. However, when the data processing apparatus is provided with a private cache arranged to store temporary copies of data which is accessed as part of the data processing operations caused by the executed instructions, the privacy of the private cache (i.e. the fact that its content is not shared with other agents and can only be modified by the data processing apparatus itself) means that out-of-order execution of load instructions, where the data is held in the private cache, are not potential data hazards. Yet the present techniques recognise that the potential for a data hazard does arise when data present in the private cache, which has been the subject of a not-yet-committed younger load instruction, is evicted from the private cache before it has been accessed by a not-yet-committed older load instruction, because of the possibility of the data to be modified by another agent which shares access to the shared storage location. In the light of this, the present techniques make use of the read-after-read buffer to track such not-yet-committed load instructions and in particular controls the eviction of an eviction candidate block of data from the private cache to the shared storage location in dependence on whether the eviction candidate block of data has a corresponding valid entry in the read-after-read buffer. This supports greater data processing efficiency, because in-use data (as indicated by the content of the read-after-read buffer) can thereby selectively be kept closer to the processing circuitry and also control can be exerted over whether the data crossed the boundary between privately controlled storage to a shared storage or not (with the data hazard consequences which that can entail).

The private cache and the shared storage location may take a variety of forms. In some examples the private cache associated with the processing circuitry forms part of a hierarchy of cache levels, and the cache content control circuitry is configured to control the eviction such that when the candidate block of data is evicted from a first level of the hierarchy the eviction candidate block of data either is allocated into a second level of the hierarchy or is evicted to the shared storage location in dependence on whether the eviction candidate block of data has the corresponding valid entry in the read-after-read buffer. For example, where the second level of the hierarchy is also a private cache level, i.e. one to which only the processing circuitry has access, this then means that eviction from the first (private) level of the hierarchy is either into the second (private) level of the hierarchy or into the shared (non-private) storage location. When the eviction candidate block of data has the corresponding valid entry in the read-after-read buffer, this means that there is not-yet-committed younger load instruction which has accessed this data in the private cache and therefore the eviction candidate block of data is advantageously caused to be allocated into the second (still private) level of the hierarchy rather than being evicted to the shared storage location, such that the out-of-order instruction execution comprising the not-yet-committed younger load instruction is not disrupted by the loss of exclusivity with respect to this block of data.

The shared storage location may take a variety of forms. In some examples the shared storage location to which the processing circuitry shares access comprises a shared cache to which further processing circuitry other than the processing circuitry also has access. In some examples the shared storage location to which the processing circuitry shares access comprises a memory to which further processing circuitry other than the processing circuitry also has access.

In some examples, the data which the instructions subject to data processing operations is stored in memory in association with a transient marker, wherein the transient marker is set for data for which a caching benefit is expected to be short-lived, and wherein each block of data in the private cache has a corresponding transient marker held in association therewith, and the eviction candidate block of data for which the cache content control circuitry is configured to control the eviction is a block of data for which the corresponding transient marker held in association therewith is set. The provision of a transient marker stored in association with some data in memory (e.g. where the transient marker is variety of memory attribute) may provide a useful qualifier selectively to influence the manner in which the data is handled by one or more caches associated with the apparatus. In particular, where the benefit of caching certain data items is expected to be short-lived, valuable cache space at a given cache level may be saved by causing such a data item not to be cached. For example, in a cache hierarchy comprising a first private cache level and a second private cache level, a cache line which is marked as transient, when evicted from the first cache level, may be caused as a result of the transient marker not to be cached in the second cache level, but to skip this level and to be directly evicted further (e.g. to a third (or further), shared cache level, or indeed to be written back to memory). However, the present techniques recognise the above described advantage associated with labelling certain data as transient may be counteracted by the disadvantage if that data is the subject of a not-yet-committed younger load instruction which is disrupted by the loss of exclusivity of the data being evicted from private cache into a shared location. Accordingly, such cache lines marked as transient represent useful beneficiaries of the present techniques.

The information held in the read-after-read buffer may be made use of in a variety of ways to seek to avoid conditions that could give rise to potential data hazard conditions, or that when they do appropriate remedial actions are taken. In some examples the read-after-read buffer is configured to monitor evictions from the private cache to the shared storage location, wherein, when a monitored eviction from the private cache to the shared storage location concerns a monitored eviction block of data which has a corresponding valid entry in the read-after-read buffer, the read-after-read buffer is configured to store a hazard indicator in association with the entry, and the read-after-read buffer is responsive to out-of-order execution of an older load instruction to determine a hazard condition to be true when an entry for a younger load instruction has the hazard indicator, and when the hazard condition is true, to signal the data hazard condition to the processing circuitry and to cause a portion of the programmed sequence of the instructions comprising the older load instruction and the younger load instruction to be re-executed.

In accordance with one example configuration there is provided a method of data processing comprising: executing instructions in processing circuitry out-of-order with respect to a programmed sequence of the instructions; storing copies of blocks of data comprising data which the instructions subject to data processing operations in a private cache associated with the processing circuitry, wherein a block of data is copied into the private cache from a shared storage location to which the processing circuitry shares access; allocating an entry into a read-after-read buffer in response to out-of-order execution of a load instruction, the entry comprising an address accessed by the load instruction, wherein the address remains as a valid entry in the read-after-read buffer until the load instruction is committed; and controlling an eviction of an eviction candidate block of data from the private cache to the shared storage location in dependence on whether the eviction candidate block of data has a corresponding valid entry in the read-after-read buffer.

In some examples the private cache associated with the processing circuitry forms part of a hierarchy of cache levels, and controlling the eviction is performed such that, when the candidate block of data is evicted from a first level of the hierarchy, the eviction candidate block of data either is allocated into a second level of the hierarchy or is evicted to the shared storage location in dependence on whether the eviction candidate block of data has the corresponding valid entry in the read-after-read buffer.

In some examples the shared storage location to which the processing circuitry shares access comprises a shared cache to which further processing circuitry other than the processing circuitry also has access.

In some examples the shared storage location to which the processing circuitry shares access comprises a memory to which further processing circuitry other than the processing circuitry also has access.

In some examples the data which the instructions subject to data processing operations is stored in memory in association with a transient marker, wherein the transient marker is set for data for which a caching benefit is expected to be short-lived, and wherein each block of data in the private cache has a corresponding transient marker held in association therewith, and the eviction candidate block of data for which the cache content control circuitry is configured to control the eviction is a block of data for which the corresponding transient marker held in association therewith is set.

In some examples the method further comprises: monitoring evictions from the private cache to the shared storage location; in response to a monitored eviction from the private cache to the shared storage location concerning a monitored eviction block of data which has a corresponding valid entry in the read-after-read buffer, storing a hazard indicator in association with the entry in the read-after-read buffer; in response to out-of-order execution of an older load instruction, determining a hazard condition to be true when an entry for a younger load instruction has the hazard indicator; and when the hazard condition is true, signalling the data hazard condition to the processing circuitry and causing a portion of the programmed sequence of the instructions comprising the older load instruction and the younger load instruction to be re-executed.

In accordance with one example configuration there is provided an apparatus comprising: means for executing instructions out-of-order with respect to a programmed sequence of the instructions; means for storing copies of blocks of data comprising data which the instructions subject to data processing operations in a private cache associated with the means for executing instructions, wherein a block of data is copied into the private cache from a shared storage location to which the means for executing instructions shares access; means for allocating an entry into a read-after-read buffer in response to out-of-order execution of a load instruction, the entry comprising an address accessed by the load instruction, wherein the address remains as a valid entry in the read-after-read buffer until the load instruction is committed; and means for controlling an eviction of an eviction candidate block of data from the private cache to the shared storage location in dependence on whether the eviction candidate block of data has a corresponding valid entry in the read-after-read buffer.

Particular embodiments will now be described with reference to the figures.

FIG. 1 illustrates a data processing apparatus 100 in accordance with some examples. The apparatus 100 comprises processing circuitry 102, a private cache 104, cache eviction control 106, and read-after-read buffer 108. The processing circuitry 102 of the data processing apparatus 100 has access to a shared storage location, to which at least one other data processing agent (not shown) also has access. This other data processing agent could take the same form as the apparatus 100, but may also be differently configured. Generally, the processing circuitry 102 is arranged to carry out data processing operations with respect to data which is retrieved from memory (which may be represented by the shared storage location 110, although in some examples the shared storage location 110 may be considered to represent a shared cache level). The processing circuitry 102 is arranged to execute instructions out-of-order with respect to a programmed sequence of the instructions and for this reason is arranged also to maintain entries in the read-after-read buffer 108, whereby out-of-order execution of a load instruction by the processing circuitry 102 causes allocation of an entry in the read-after-read buffer 108. An entry in the read-after-read buffer 109 comprises an indication of an address accessed by the load instruction and this indication remains as a valid entry in the read-after-read buffer until the load instruction is committed. The cache eviction control circuitry 106 is configured to exert control over the eviction of an eviction candidate block of data from the private cache 104 to the shared storage location 110, in particular in dependence on whether the eviction candidate block of data has a corresponding valid entry in the read-after-read buffer 108. This control can take a number of forms, although broadly speaking a central feature of the control concerns whether the subject cache block of data is allowed to cross from the "private domain" (i.e. in the example of FIG. 1, the private cache 104) into the "shared domain" (i.e. in the example of FIG. 1, the shared storage location 110). Note that each of these domains could take a number of forms and could comprise more than one subcomponent, for example the private cache 104 could in fact be a hierarchy of multiple private cache levels and/or the shared storage location 110 could in fact be a shared cache hierarchy possibly including the memory from which the relevant cache lines originate. Overall, the present techniques are based on a determination of whether subject cache block of data is allowed to cross from the "private domain" into the "shared domain" on the basis of whether a corresponding address forming part of the subject cache line is currently a valid entry in the read-after-read buffer. When this is the case, i.e. when that corresponding address has been accessed by an out-of-order executed load instruction which has not yet been committed, the cache eviction control intervenes to prevent the subject cache block of data from crossing from the "private domain" into the "shared domain", since otherwise this would expose the data at that address to modification by another agent which has access to the shared storage location, representing a potential data hazard.

Figure 2:
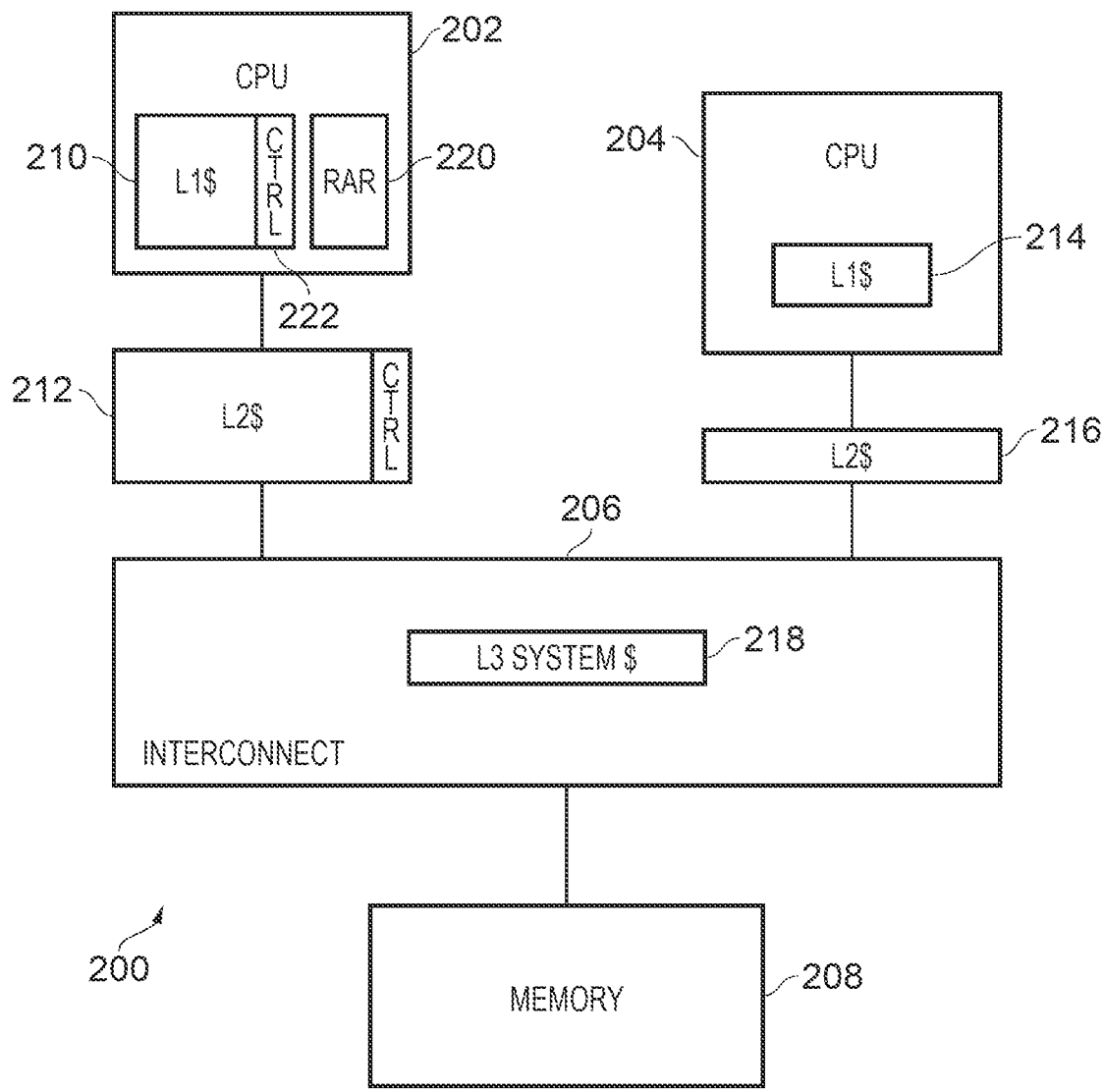
FIG. 2 schematically illustrates a data processing system in accordance with some examples.

FIG. 2 schematically illustrates a data processing system 200 in accordance with some examples. Two CPUs 202, 204 are shown, each of which has to a memory 208. Furthermore, CPU 202 is provided with a private L1 cache 210 and a private L2 cache 212, i.e. cache lines held in either of these two caches are only accessed by CPU 202. Similarly, CPU 204 is provided with a private L1 cache 214 and a private L2 cache 216, and cache lines held in either of these two caches are only accessed by CPU 204. The CPUs 202, 204 are each coupled to the interconnect 206, via which they can access the memory 208, and the interconnect 206 is further provided with a L3 system cache 218. Accordingly, a cache line held in the L3 system cache 218 is accessible to both the CPU 202 and the CPU 204. The CPU 202 is arranged to perform out-of-order instruction execution and is provided with read-after-read (RAR) buffer 220 in support thereof, whereby an entry in the RAR buffer 220 is allocated for the address accessed by an out-of-order executed load instruction and this entry remains valid until the load instruction is committed. Control circuitry 222 associated with the L1 cache 210 determines the manner in which evictions from the L1 cache 210 are carried out with reference to the content of the RAR buffer 220. Certain cache lines evicted from the L1 cache 210 may be evicted directly to the L3 system cache 218 (i.e. skipping the L2 cache 212) in order to free up space in the smaller private L1 and L2 caches. However, when the control circuitry 222 determines that a cache line which is to be evicted from the L1 cache 210 has a corresponding valid entry in the RAR 220 it intervenes to cause the cache line to be evicted to the L2 cache 212. This prevents the possibility of a data hazard arising as a result of the cache line being evicted to the shared storage location of the L3 cache 218 to which CPU 204 also has access.

Figure 3:
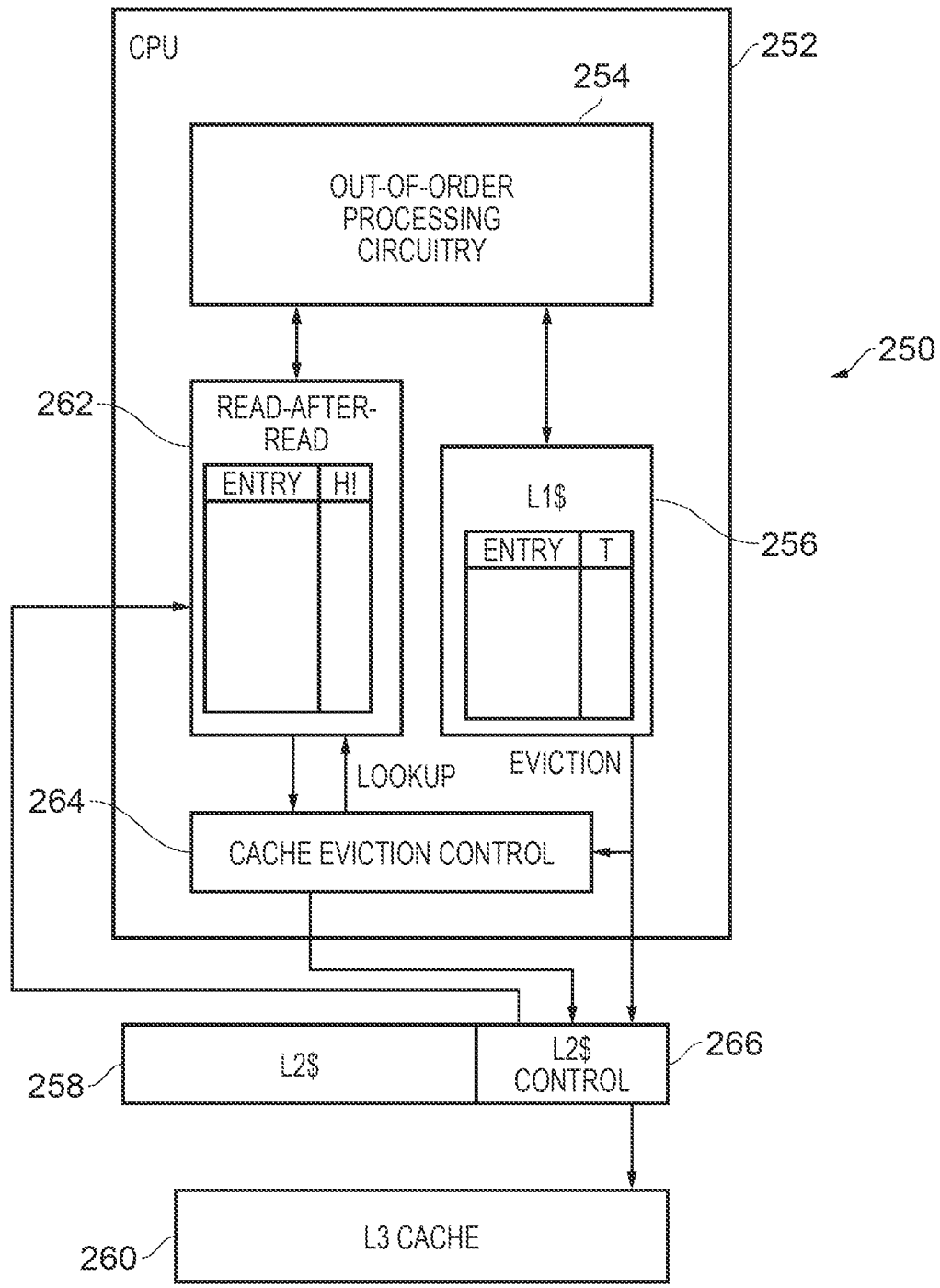
FIG. 3 schematically illustrates a data processing apparatus in accordance with some examples.

FIG. 3 schematically illustrates a data processing apparatus 250 in accordance with some examples. The apparatus comprises CPU 252, which is an out-of-order processor is provided with out-of-order processing circuitry 254. Data which is subjected to the data processing operation is defined by the instructions which it executes are cached in a cache hierarchy comprising L1 cache 256, L2 cache 258, and L3 system cache 260. L1 cache 256 and L2 cache 258 are private to the CPU 252, whilst access to the L3 system cache 260 is shared with other agents (not illustrated) in the wider system. As an out-of-order processor the CPU 252 is also provided with read-after-read (RAR) buffer 262. An entry in the RAR buffer 262 is allocated for an address accessed by an out-of-order executed load instruction and this entry remains valid until the load instruction is committed. L2 cache control circuitry 266 sends indications of cache lines which are evicted from L2 cache 258 to L3 cache 260. When a cache line evicted from L2 cache 258 corresponds to (i.e. comprises) an address for which there is a valid entry in the RAR buffer 262, this entry has a tracking bit set to indicate "hazard" (H!). Older loads which are executed by the out-of-order processing circuitry 254 lookup in the RAR buffer 262 to check if a younger load has a valid entry with the hazard bit set. When this occurs, the out of order processing circuitry 254 discards the younger loads and replays the corresponding set of instructions.

Cache lines which are cached in the L1 cache 256 may have an associated memory attribute marker set, which indicates a "transient" (T) status. This attribute is used to identify those data items for which the benefit of caching is expected to persist for only a relatively short period of time. In consequence, when a cache line is evicted from the L1 cache 256, generally speaking the L2 cache control 266 is arranged to examine this "transient" marker and for those cache lines for which it is set the L2 cache control 266 causes the cache line to bypass L2 and to be evicted directly to the L3 system cache 260. However, the cache eviction control circuitry 264 also monitors the evictions from the L1 cache 256 and for each performs a lookup in the RAR buffer 262. When an evicted L1 cache line is a corresponding entry in the RAR buffer 262, the cache eviction control circuitry 264 signals this to the L2 cache control 266 which overrides the usual effect of the "transient" marker and this causes the cache line not to bypass L2 and to allocated into the L2 cache 258. This retains the data within the private domain of the CPU 252 and avoids a hazard status for the entry in the RAR buffer 262. Note that this technique does not require the shared storage location represented by the L3 system cache 260 to be a further cache level and in other examples therefore the L3 system cache 260 of FIG. 3 could be substituted by the memory from which the data processed by the CPU 252 are retrieved.

Figure 4:
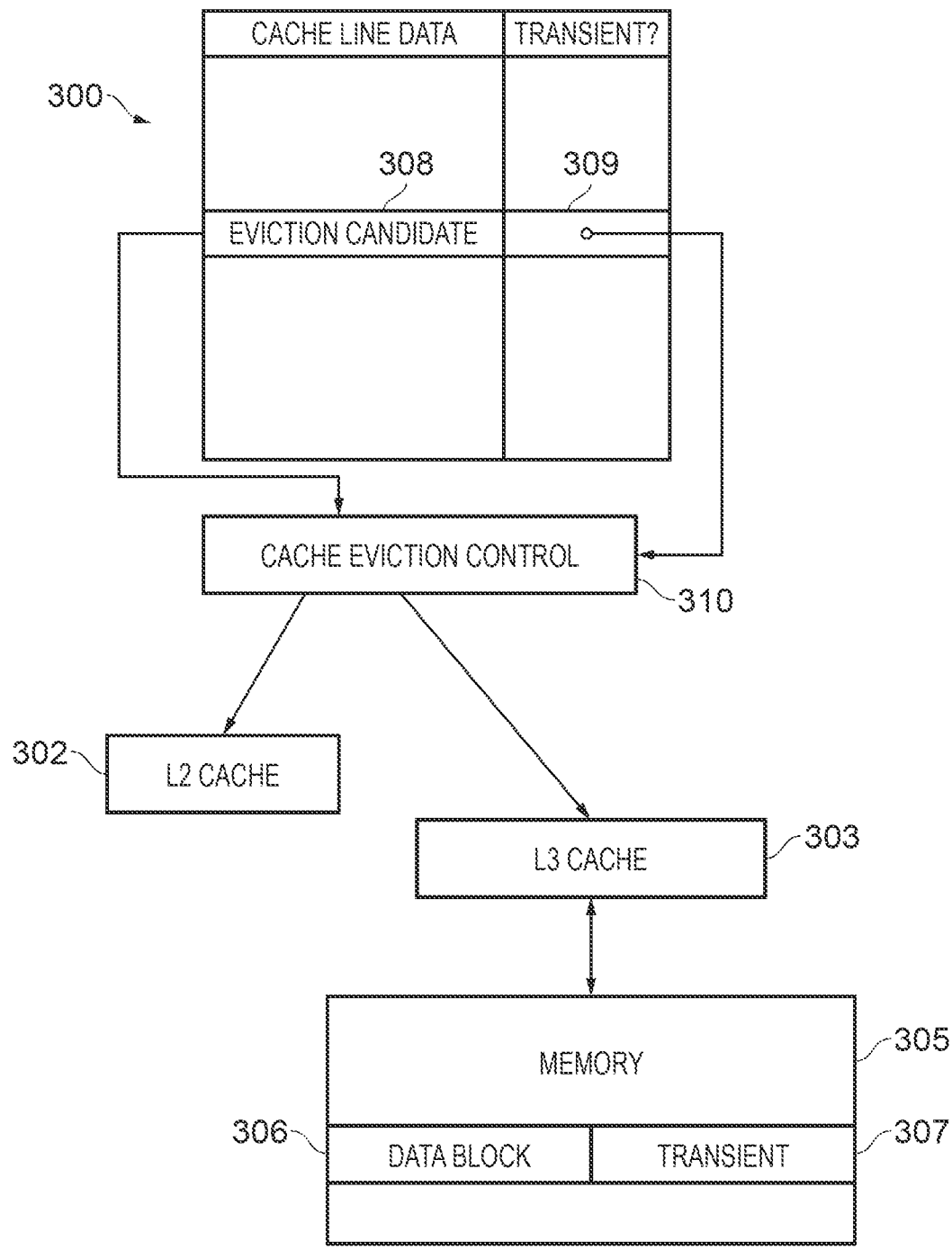
FIG. 4 schematically illustrates the operation of cache eviction control in accordance with some examples.

FIG. 4 schematically illustrates the operation of cache eviction control in accordance with some examples. An L1 cache 300 forms part of a cache hierarchy, further comprising an L2 cache 302 and an L3 cache 303. The data cached in the cache hierarchy is retrieved from a memory 305. The L1 cache 300 and the L2 cache 302 are private cache levels serving only one particular data processing agent, whilst the L3 cache 303 is shared by more than one data processing agent. A data cache line retrieved from the memory 35 comprises a data block 306 and a marker bit 307 indicating whether the data block is defined as "transient" or not. This transient marker forms part of the cache line data which is brought into the cache hierarchy. When a new allocation is required to be made into the L1 cache 300, the transient marker bit 309 of a candidate cache line for eviction 308 is passed to the cache eviction control circuitry 310. Generally, when the transient bit is not set, eviction of the eviction candidate 308 causes it to be evicted to the L2 cache 302. Conversely, when the transient bit is set, the eviction candidate 308 is evicted to the L3 cache 303. Note that this description of FIG. 3 thus forms the context in which the present techniques are applied, i.e. whereby as described elsewhere herein the presence of a corresponding valid entry in the read-after-read buffer causes the eviction of a cache line with a set transient bit not to skip the L2 cache and indeed to be held at the still-private L2 cache level, rather than skipping L2 and being evicted to the shared L3 cache level.

Figure 5:
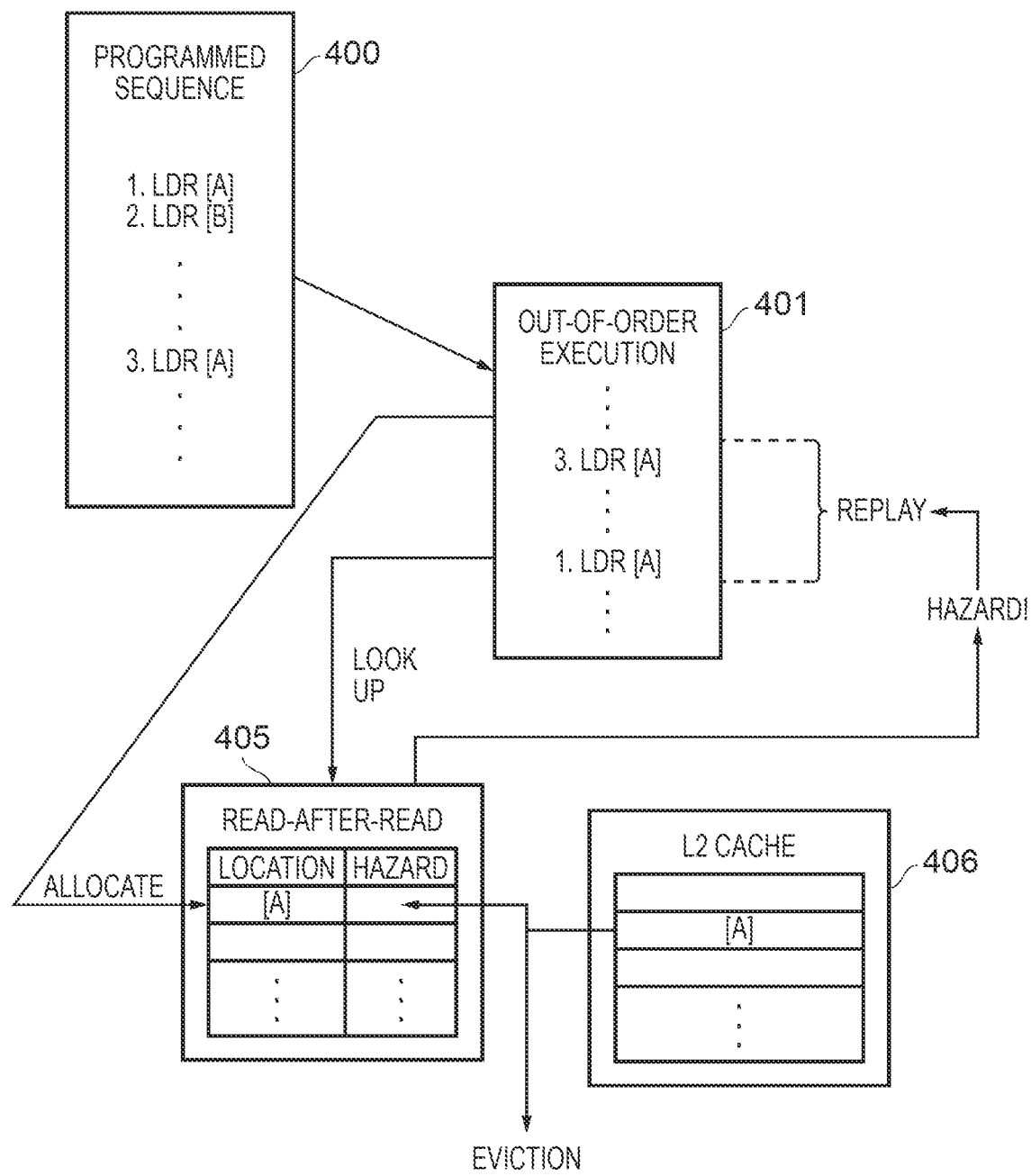
FIG. 5 schematically illustrates the out of order execution of a programmed sequence of instructions and the associated operation of cache eviction control in accordance with some examples.

FIG. 5 schematically illustrates the out of order execution of a programmed sequence of instructions 400 and the associated operation of cache eviction control in accordance with some examples. As will be familiar to one of ordinary skill in the art, the instructions of programme sequence of instructions 400 have a particular ordering (as enumerated in the figure). However, this ordering may not be the actual order in which these instructions are executed when there are executed by an out-of-order processor (as shown by the rearranged instruction ordering 401). As is shown the figure the rearranged instruction ordering 401 has resulted in the younger load instruction "3. LDR[A]" being executed before the older load instruction "1. LDR[A]". The execution of the younger load instruction "3. LDR[A]" causes the allocation of an entry for address [A] into the read-after-read buffer 405. When the subsequent execution of the older load instruction "1. LDR[A]" occurs address [A] is looked up in the read-after-read buffer 405. As long as the hazard bit associated with the valid entry for address [A] is not set, then the execution of the older load instruction "1. LDR[A]" is not disrupted. Once these instructions are committed, the entry for [A] is no longer valid (and the entry will be overwritten by further out-of-order execution of load instructions). Note however that an eviction of a cache line from the L2 cache 406 also causes a lookup in the read-after-read buffer 405. When the addresses of the data in that L2 evicted cache line include and address with a valid entry in the read-after-read buffer 405, then the hazard bit associated with the entry is set. Accordingly, in the situation illustrated in FIG. 5, where the eviction of a cache line from the L2 cache 406 comprising the address [A] occurs after the younger load instruction "3. LDR[A]" has accessed the data at address [A], but before the older load instruction "1. LDR[A]" has accessed the data at address [A], the lookup which the older load instruction "1. LDR[A]" triggers in the read-after-read buffer 405 hits on a valid entry for the address [A] which also has the hazard bit set, and this triggers a flush and replay of the processing carried out for the subset of instructions comprising "3. LDR[A]" and "1. LDR[A]". However, the application of the present techniques, whereby the presence of the valid entry for address [A] would keep the corresponding cache line in the L2 cache, avoids such replays.

Figure 6:
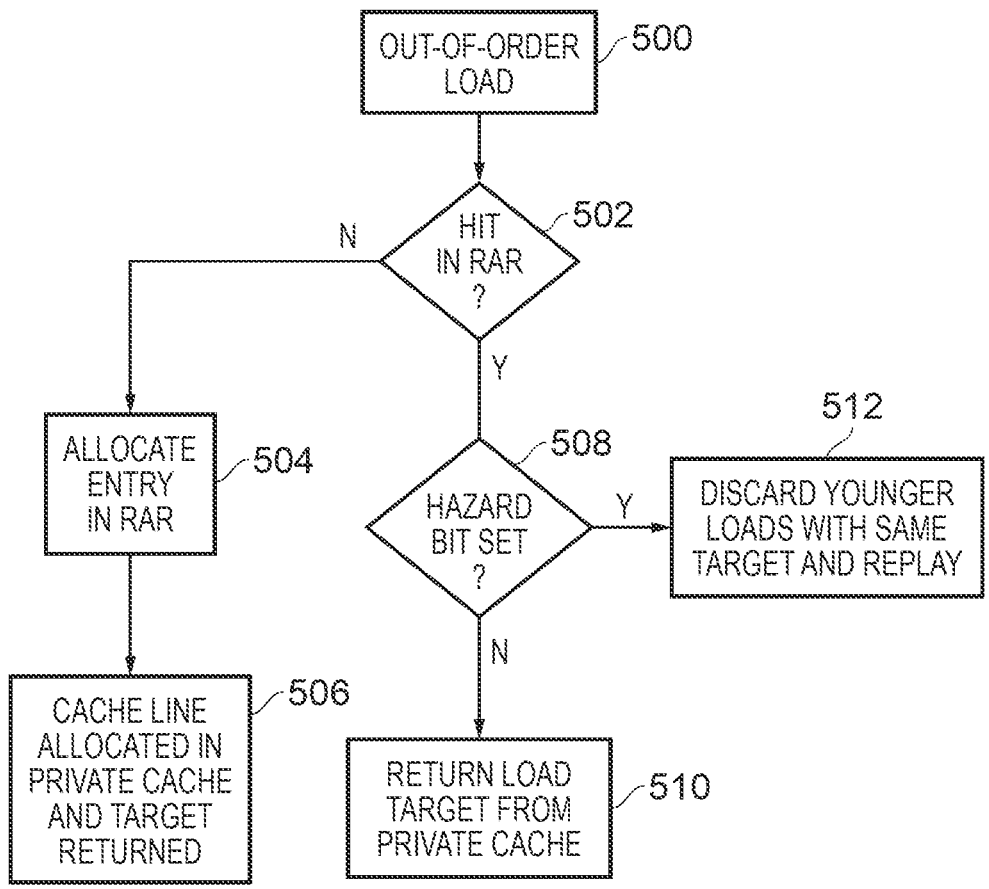
FIG. 6 is a flow diagram showing a sequence of steps which are taken according to the method of some examples.

FIG. 6 is a flow diagram showing a sequence of steps which are taken according to the method of some examples. These steps are carried out in a data processing apparatus performing out-of-order instruction execution. Starting with step 500, out-of-order execution of a load instruction triggers this sequence of steps. At step 502 a lookup in the read-after-read buffer is performed on the basis of the target address of the load instruction. If this lookup misses, then the flow proceeds to step 504, where an entry in the read-after-read buffer for this address is allocated. When the corresponding data is retrieved, at step 506 a cache line is allocated into the private cache and the required data identified by the target address is returned to the processor. However, if at step 502 there is a hit in the read-after-read buffer for this address, then the flow proceeds to step 508, where it is determined if the hazard bit associated with the entry is set. If it is not, then the flow proceeds to step 510 and the data which is the target of the load instruction can be returned from the private cache to the processor. However, if at step 508 it is determined that the hazard bit associated with the entry is set then the flow proceeds to step 512, where a replay is triggered with any younger loads with the same target being discarded and re-executed.

Figure 7:
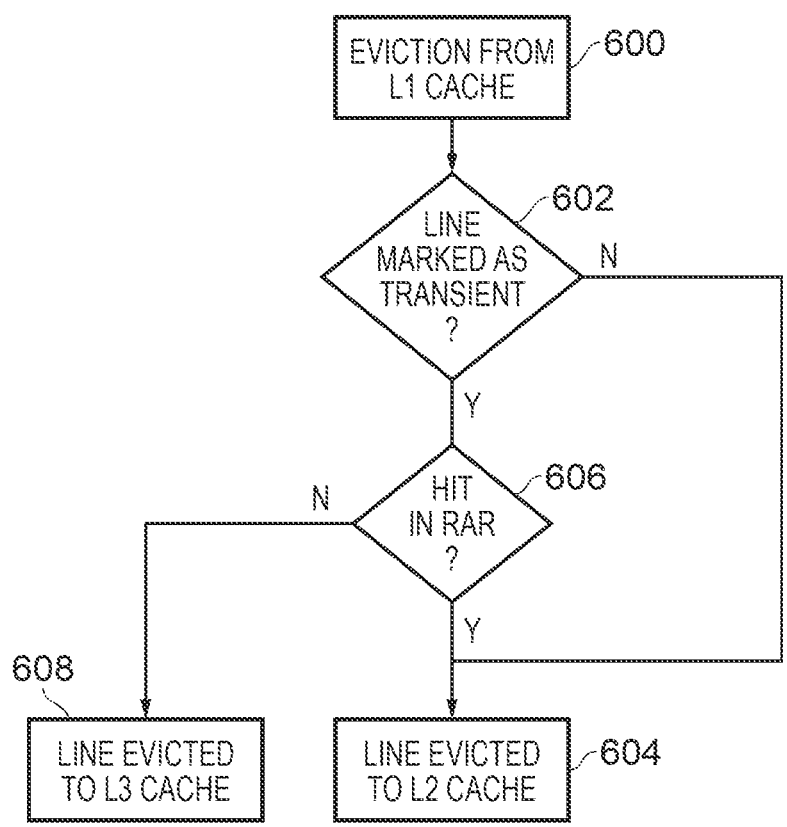
FIG. 7 is a flow diagram showing a sequence of steps which are taken in accordance with the method of some examples.

FIG. 7 is a flow diagram showing a sequence of steps which are taken in accordance with the method of some examples. The steps carried out in a data processing apparatus performing out-of-order instruction execution. The sequence begins at step 600 and when there is an eviction from the L1 cache. It is then determined at step 602 if the evicted cache line has the "transient" marker set. If it does not, then the eviction proceeds with the cache line being evicted to the L2 cache at step 604. Conversely, if the "transient" marker is set, then at step 606 it is determined if there is a corresponding hit in the read-after-read buffer. If there is not, then this "transient" marked cache line can be evicted to the L3 cache at step 608. However, when there is a corresponding valid entry in the read-after-read buffer, this suppresses the usual eviction behaviour for transient cache lines and the line is evicted to the L2 cache at step 604.

The present techniques may also be embodied in the following configurations set out as numbered clauses:

1 Apparatus comprising:

processing circuitry configured to execute instructions out-of-order with respect to a programmed sequence of the instructions;

a private cache associated with the processing circuitry and configured to store copies of blocks of data comprising data which the instructions subject to data processing operations, wherein a block of data is copied into the private cache from a shared storage location to which the processing circuitry shares access;

a read-after-read buffer, wherein out-of-order execution of a load instruction by the processing circuitry is configured to cause allocation of an entry in the read-after-read buffer comprising a block of data accessed by the load instruction, wherein the block of data remains as a valid entry in the read-after-read buffer until the load instruction is committed; and cache content control circuitry is configured to control an eviction of an eviction candidate block of data from the private cache to the shared storage location in dependence on whether the eviction candidate block of data has a corresponding valid entry in the read-after-read buffer.

2. The apparatus as defined in clause 1, wherein the private cache associated with the processing circuitry forms part of a hierarchy of cache levels, and the cache content control circuitry is configured to control the eviction such that when the candidate block of data is evicted from a first level of the hierarchy the eviction candidate block of data either is allocated into a second level of the hierarchy or is evicted to the shared storage location in dependence on whether the eviction candidate block of data has the corresponding valid entry in the read-after-read buffer.

3. The apparatus as defined in clause 1 or clause 2, wherein the shared storage location to which the processing circuitry shares access comprises a shared cache to which further processing circuitry other than the processing circuitry also has access.

4. The apparatus as defined in any of clauses 1-3, wherein the shared storage location to which the processing circuitry shares access comprises a memory to which further processing circuitry other than the processing circuitry also has access.

5. The apparatus as defined in any of clauses 1-4, wherein the data which the instructions subject to data processing operations is stored in memory in association with a transient marker, wherein the transient marker is set for data for which a caching benefit is expected to be short-lived, and wherein each block of data in the private cache has a corresponding transient marker held in association therewith, and the eviction candidate block of data for which the cache content control circuitry is configured to control the eviction is a block of data for which the corresponding transient marker held in association therewith is set.

6. The apparatus as defined in any of clauses 1-5, wherein the read-after-read buffer is configured to monitor evictions from the private cache to the shared storage location, wherein, when a monitored eviction from the private cache to the shared storage location concerns a monitored eviction block of data which has a corresponding valid entry in the read-after-read buffer, the read-after-read buffer is configured to store a hazard indicator in association with the entry, and the read-after-read buffer is responsive to out-of-order execution of an older load instruction to determine a hazard condition to be true when an entry for a younger load instruction has the hazard indicator, and when the hazard condition is true, to signal the data hazard condition to the processing circuitry and to cause a portion of the programmed sequence of the instructions comprising the older load instruction and the younger load instruction to be re-executed.

7. A method of data processing comprising:

executing instructions in processing circuitry out-of-order with respect to a programmed sequence of the instructions;

storing copies of blocks of data comprising data which the instructions subject to data processing operations in a private cache associated with the processing circuitry, wherein a block of data is copied into the private cache from a shared storage location to which the processing circuitry shares access;

allocating an entry into a read-after-read buffer in response to out-of-order execution of a load instruction, the entry comprising an address accessed by the load instruction, wherein the address remains as a valid entry in the read-after-read buffer until the load instruction is committed; and controlling an eviction of an eviction candidate block of data from the private cache to the shared storage location in dependence on whether the eviction candidate block of data has a corresponding valid entry in the read-after-read buffer.

8. The method as defined in clause 7, wherein the private cache associated with the processing circuitry forms part of a hierarchy of cache levels, and controlling the eviction is performed such that, when the candidate block of data is evicted from a first level of the hierarchy, the eviction candidate block of data either is allocated into a second level of the hierarchy or is evicted to the shared storage location in dependence on whether the eviction candidate block of data has the corresponding valid entry in the read-after-read buffer.

9. The method as defined in clause 7 or clause 8, wherein the shared storage location to which the processing circuitry shares access comprises a shared cache to which further processing circuitry other than the processing circuitry also has access.

10. The method as defined in any of clauses 7-9, wherein the shared storage location to which the processing circuitry shares access comprises a memory to which further processing circuitry other than the processing circuitry also has access.

11. The method as defined in any of clauses 7-10, wherein the data which the instructions subject to data processing operations is stored in memory in association with a transient marker, wherein the transient marker is set for data for which a caching benefit is expected to be short-lived, and wherein each block of data in the private cache has a corresponding transient marker held in association therewith, and the eviction candidate block of data for which the cache content control circuitry is configured to control the eviction is a block of data for which the corresponding transient marker held in association therewith is set.

12. The method as defined in any of clauses 7-11, further comprising:

monitoring evictions from the private cache to the shared storage location;

in response to a monitored eviction from the private cache to the shared storage location concerning a monitored eviction block of data which has a corresponding valid entry in the read-after-read buffer, storing a hazard indicator in association with the entry in the read-after-read buffer;

in response to out-of-order execution of an older load instruction, determining a hazard condition to be true when an entry for a younger load instruction has the hazard indicator;

and when the hazard condition is true, signalling the data hazard condition to the processing circuitry and causing a portion of the programmed sequence of the instructions comprising the older load instruction and the younger load instruction to be re-executed.

13. Apparatus comprising:

means for executing instructions out-of-order with respect to a programmed sequence of the instructions;

means for storing copies of blocks of data comprising data which the instructions subject to data processing operations in a private cache associated with the means for executing instructions, wherein a block of data is copied into the private cache from a shared storage location to which the means for executing instructions shares access;

means for allocating an entry into a read-after-read buffer in response to out-of-order execution of a load instruction, the entry comprising an address accessed by the load instruction, wherein the address remains as a valid entry in the read-after-read buffer until the load instruction is committed; and means for controlling an eviction of an eviction candidate block of data from the private cache to the shared storage location in dependence on whether the eviction candidate block of data has a corresponding valid entry in the read-after-read buffer.

In brief overall summary apparatuses and methods relating to controlling cache evictions are disclosed. Processing circuitry which execute instructions out-of-order is provided with a private cache into which blocks of data are copied from a shared storage location to which the processing circuitry shares access. The processing circuitry also has a read-after-read buffer, into which an entry is allocated when out-of-order execution of a load instruction occurs comprising an address accessed by the load instruction. The address remains as a valid entry in the read-after-read buffer until the load instruction is committed. Eviction of an eviction candidate block of data from the private cache to the shared storage location is controlled in dependence on whether the eviction candidate block of data has a corresponding valid entry in the read-after-read buffer.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:
1. Apparatus comprising:
processing circuitry configured to execute instructions out-of-order with respect to a programmed sequence of the instructions;
a private cache associated with the processing circuitry and configured to store copies of blocks of data comprising data which the instructions subject to data processing operations, wherein a block of data is copied into the private cache from a shared storage location to which the processing circuitry shares access;
a read-after-read buffer, wherein out-of-order execution of a load instruction by the processing circuitry is configured to cause allocation of an entry in the read-after-read buffer comprising an address accessed by the load instruction, wherein the address remains as a valid entry in the read-after-read buffer until the load instruction is committed; and
cache content control circuitry is configured to control an eviction of an eviction candidate block of data from the private cache to the shared storage location in dependence on whether the eviction candidate block of data has a corresponding valid entry in the read-after-read buffer.

2. The apparatus as claimed in claim 1, wherein the private cache associated with the processing circuitry forms part of a hierarchy of cache levels,
and the cache content control circuitry is configured to control the eviction such that when the candidate block of data is evicted from a first level of the hierarchy the eviction candidate block of data either is allocated into a second level of the hierarchy or is evicted to the shared storage location in dependence on whether the eviction candidate block of data has the corresponding valid entry in the read-after-read buffer.

3. The apparatus as claimed in claim 1, wherein the shared storage location to which the processing circuitry shares access comprises a shared cache to which further processing circuitry other than the processing circuitry also has access.

4. The apparatus as claimed in claim 1, wherein the shared storage location to which the processing circuitry shares access comprises a memory to which further processing circuitry other than the processing circuitry also has access.

5. The apparatus as claimed in claim 1, wherein the data which the instructions subject to data processing operations is stored in memory in association with a transient marker, wherein the transient marker is set for data for which a caching benefit is expected to be short-lived,
and wherein each block of data in the private cache has a corresponding transient marker held in association therewith,
and the eviction candidate block of data for which the cache content control circuitry is configured to control the eviction is a block of data for which the corresponding transient marker held in association therewith is set.

6. The apparatus as claimed in claim 1, wherein the read-after-read buffer is configured to monitor evictions from the private cache to the shared storage location,
wherein, when a monitored eviction from the private cache to the shared storage location concerns a monitored eviction block of data which has a corresponding valid entry in the read-after-read buffer, the read-after-read buffer is configured to store a hazard indicator in association with the entry,
and the read-after-read buffer is responsive to out-of-order execution of an older load instruction to determine a hazard condition to be true when an entry for a younger load instruction has the hazard indicator, and when the hazard condition is true, to signal the data hazard condition to the processing circuitry and to cause a portion of the programmed sequence of the instructions comprising the older load instruction and the younger load instruction to be re-executed.

7. A method of data processing comprising:
executing instructions in processing circuitry out-of-order with respect to a programmed sequence of the instructions;
storing copies of blocks of data comprising data which the instructions subject to data processing operations in a private cache associated with the processing circuitry, wherein a block of data is copied into the private cache from a shared storage location to which the processing circuitry shares access;
allocating an entry into a read-after-read buffer in response to out-of-order execution of a load instruction, the entry comprising an address accessed by the load instruction, wherein the address remains as a valid entry in the read-after-read buffer until the load instruction is committed; and
controlling an eviction of an eviction candidate block of data from the private cache to the shared storage location in dependence on whether the eviction candidate block of data has a corresponding valid entry in the read-after-read buffer.

8. The method as claimed in claim 7, wherein the private cache associated with the processing circuitry forms part of a hierarchy of cache levels,
and controlling the eviction is performed such that, when the candidate block of data is evicted from a first level of the hierarchy, the eviction candidate block of data either is allocated into a second level of the hierarchy or is evicted to the shared storage location in dependence on whether the eviction candidate block of data has the corresponding valid entry in the read-after-read buffer.

9. The method as claimed in claim 7, wherein the shared storage location to which the processing circuitry shares access comprises a shared cache to which further processing circuitry other than the processing circuitry also has access.

10. The method as claimed in claim 7, wherein the shared storage location to which the processing circuitry shares access comprises a memory to which further processing circuitry other than the processing circuitry also has access.

11. The method as claimed in claim 7, wherein the data which the instructions subject to data processing operations is stored in memory in association with a transient marker, wherein the transient marker is set for data for which a caching benefit is expected to be short-lived,
and wherein each block of data in the private cache has a corresponding transient marker held in association therewith,
and the eviction candidate block of data for which the cache content control circuitry is configured to control the eviction is a block of data for which the corresponding transient marker held in association therewith is set.

12. The method as claimed in claim 7, further comprising:
monitoring evictions from the private cache to the shared storage location;
in response to a monitored eviction from the private cache to the shared storage location concerning a monitored eviction block of data which has a corresponding valid entry in the read-after-read buffer, storing a hazard indicator in association with the entry in the read-after-read buffer;

in response to out-of-order execution of an older load instruction, determining a hazard condition to be true when an entry for a younger load instruction has the hazard indicator;

and when the hazard condition is true, signalling the data hazard condition to the processing circuitry and causing a portion of the programmed sequence of the instructions comprising the older load instruction and the younger load instruction to be re-executed.

13. Apparatus comprising:

means for executing instructions out-of-order with respect to a programmed sequence of the instructions;

means for storing copies of blocks of data comprising data which the instructions subject to data processing operations in a private cache associated with the means for executing instructions, wherein a block of data is copied into the private cache from a shared storage location to which the means for executing instructions shares access;

means for allocating an entry into a read-after-read buffer in response to out-of-order execution of a load instruction, the entry comprising an address accessed by the load instruction, wherein the address remains as a valid entry in the read-after-read buffer until the load instruction is committed; and means for controlling an eviction of an eviction candidate block of data from the private cache to the shared storage location in dependence on whether the eviction candidate block of data has a corresponding valid entry in the read-after-read buffer.

* * * * *